United States Patent
Liu et al.

(10) Patent No.: US 10,093,776 B2
(45) Date of Patent: Oct. 9, 2018

(54) MASTERBATCH CONTAINING HEAT-SENSITIVE FUNCTIONAL ADDITIVE

(71) Applicant: PolyOne—Shanghai, China, Shanghai (CN)

(72) Inventors: Mengge Liu, Shanghai (CN); Yonghua Rhett Liu, Shanghai (CN); Wenyu Shang, Shanghai (CN); Yinyin Zhao, Shanghai (CN)

(73) Assignee: PolyOne-Shanghai, China, Shanghai (CN)

( * ) Notice: Subject to any disclaimer, the term of this patent is extended or adjusted under 35 U.S.C. 154(b) by 0 days.

(21) Appl. No.: 15/501,635

(22) PCT Filed: Jul. 13, 2015

(86) PCT No.: PCT/CN2015/083839
§ 371 (c)(1),
(2) Date: Feb. 3, 2017

(87) PCT Pub. No.: WO2016/019777
PCT Pub. Date: Feb. 11, 2016

(65) Prior Publication Data
US 2017/0226296 A1  Aug. 10, 2017

(30) Foreign Application Priority Data

Aug. 7, 2014  (CN) .......................... 2014 1 0386560

(51) Int. Cl.
| | | |
|---|---|---|
| C08J 3/20 | (2006.01) | |
| C08J 3/22 | (2006.01) | |
| C08K 3/26 | (2006.01) | |
| C08L 23/08 | (2006.01) | |
| C08K 3/22 | (2006.01) | |

(52) U.S. Cl.
CPC ................. *C08J 3/226* (2013.01); *C08K 3/22* (2013.01); *C08K 3/26* (2013.01); *C08L 23/0853* (2013.01); *C08J 2423/08* (2013.01); *C08K 2003/2265* (2013.01); *C08K 2003/265* (2013.01); *C08L 2205/025* (2013.01); *C08L 2310/00* (2013.01)

(58) Field of Classification Search
CPC ... C08J 3/226; C08K 3/22; C08K 3/26; C08L 23/0853
See application file for complete search history.

(56) References Cited

U.S. PATENT DOCUMENTS

| | | | | |
|---|---|---|---|---|
| 5,236,962 A | * | 8/1993 | Govoni | ................... C08C 19/22 |
| | | | | 521/134 |
| 6,123,409 A | | 9/2000 | Wolf | |
| 8,007,707 B1 | | 8/2011 | Brown et al. | |
| 2010/0048796 A1 | * | 2/2010 | Prejean | ................... C08L 23/08 |
| | | | | 524/502 |
| 2012/0024376 A1 | | 2/2012 | Fukudome et al. | |

FOREIGN PATENT DOCUMENTS

| | | |
|---|---|---|
| CN | 1800259 A | 7/2006 |
| CN | 101240114 A | 8/2008 |
| CN | 101338049 A | 1/2009 |
| CN | 101824183 A | 9/2010 |
| CN | 102558680 A | 7/2012 |
| CN | 102924780 | 2/2013 |
| CN | 103183867 | 7/2013 |
| CN | 103289184 | 9/2013 |
| CN | 103524858 | 1/2014 |
| JP | 5620055 A | 2/1981 |
| KR | 10-2008-0073555 A | 8/2008 |
| KR | 10-2014-0017044 | 2/2014 |

OTHER PUBLICATIONS

Chen Kequan et al.: Study on the interface behavior between essence and ethylene-vinyl acetate copolymer pallets; Acta Polymerica Sinica, Dec. 31, 2000, No. 6, pp. 668-671.
Chen Zhi-Jian et al.: Development of Fragrance PVC; China Plastics Industry, Nov. 30, 2003, vol. 31, No. 11, pp. 49-51.
English Translation of Chinese Patent Office Search Report for Chinese Priority Patent Application 201410386560.5 (2014).
European Patent Office "Extended European Search Report" (dated Mar. 16, 2018).
Derwent Abstract of JPS60147443 (1985).
Derwent Abstract of CN1488785 (2004).
Derwent Abstract of JP2009184887 (2009).

* cited by examiner

Primary Examiner — Hannah J Pak
(74) Attorney, Agent, or Firm — John H. Hornickel

(57) ABSTRACT

A heat-sensitive functional additive is protected from multiple heat histories by being mixed at ambient temperature with a pre-formed masterbatch, for let down into thermoplastic resin at the time of final-shaping of the plastic article.

5 Claims, No Drawings

MASTERBATCH CONTAINING HEAT-SENSITIVE FUNCTIONAL ADDITIVE

FIELD OF THE INVENTION

This invention relates to masterbatches to which heat-sensitive materials are added and methods of making those masterbatches.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products.

Heat is used in thermoplastics mixing to melt the thermoplastic resin to produce intermediate powder or pellets for later reshaping into a plastic article, a "first heat history", or the final shaping step itself, a "second heat history."

Some functional additives are very sensitive to heat. If the functional additive has a relatively high vapor pressure at temperatures required to melt the thermoplastic resin, either during the first heat history or the second heat history, the functional additive (usually the most expensive per unit mass) will vaporize to reduce or even remove all traces of its addition in the final plastic article.

SUMMARY OF THE INVENTION

What the art needs is a method to minimize the effects of heat history by introducing the expensive and volatile functional additive into a masterbatch after the first heat history of that masterbatch and before the masterbatch is introduced into the melt mixing of a thermoplastic resin to make the final shape of the thermoplastic article.

The present invention has found that the expensive and volatile functional additive does not escape all heat history, but the innovative method eliminates the first heat history and reduces the effect of the second history as compared with introducing that functional additive, without the protection of the masterbatch ingredients, directly into the molten thermoplastic resin.

One aspect of the invention is a masterbatch, comprising: (a) heat-sensitive functional additive, (b) ethylene vinyl acetate, and (c) optionally an inorganic filler, wherein the ethylene vinyl acetate comprises at least 35 weight percent of the masterbatch, and wherein the heat-sensitive functional additive has been mixed into the masterbatch at ambient temperature.

"Heat-sensitive functional additive" means an additive which provides to a thermoplastic article a particular desired function but which is volatile enough to be reduced in quantity by vaporization if left unmixed from other ingredients at the time of its melt mixing with a thermoplastic resin. More particularly, the heat-sensitive functional additive has a boiling point less than about 150° C. Non-limiting examples of heat-sensitive functional additives include fragrances, colorants, ultraviolet or visible light absorbers, lubricants, anti-static agents, antimicrobial agents, etc.

Features will become apparent from a description of the embodiments of the invention.

EMBODIMENTS OF THE INVENTION

Masterbatch for Heat Sensitive Functional Additive
Thermoplastic Polymer Carrier Resin Any thermoplastic resin is a candidate for the carrier resin for the masterbatch because there is a desire for any of these resins to also be the material into which the masterbatch is melt-mixed. The resin can be ethylene vinyl acetate (EVA) alone or in combination with polypropylene (PP), polyethylene (PE), polyvinyl chloride (PVC), polycarbonate (PC), acrylonitrile-butadiene-styrene (ABS), polyethylene terephthalate (PET), polybutylene terephthalate (PBT), polyoxymethylene (POM), polyamide (PA), polystyrene (PS), polymethylmethacrylate (PMMA), polyphenylene sulfide (PPS), polylactic acid (PLA), any copolymer of any of them, and any combination thereof; or other second material serving as a carrier resin.

The resin can have a weight average molecular weight ranging from about 3000 to about $3\times10^6$, and preferably from about 50,000 to about 500,000.

The resin can have a glass transition temperature ranging from about −100° C. to about 300° C., and preferably from about −50° C. to about 200° C.

The resin can have a particle size ranging from about 10 to about 10,000 microns, and preferably from about 500 to about 5000 microns.

Non-limiting examples of commercially available heat-sensitive thermoplastic resins include: Elvax™ ethylene vinyl acetate copolymer from DuPont and polypropylene polymer from Jinshan.

Optional Filler

Filler can be useful in the masterbatch to assist in the absorption of the heat-sensitive functional additive into the masterbatch. Any filler, particularly inorganic filler, is a candidate for use in the present invention, such as talc, mica, barium sulfate, titanium dioxide, calcium carbonate, and silicon dioxide. Of the possible filler candidates when filler is desired to be used, calcium carbonate is preferred due to cost and overall performance.

Table 1 shows acceptable, desirable, and preferable ranges of ingredients useful in the present invention, all expressed in weight percent (wt. %) of the entire compound. The compound can comprise, consist essentially of, or consist of these ingredients. Any number between the ends of the ranges is also contemplated as an end of a range, such that all possible combinations are contemplated within the possibilities of Table 1 as candidate compounds for use in this invention.

TABLE 1

Masterbatch Before Heat-Sensitive Functional Additive Addition

| Ingredient (Wt. %) | Acceptable Range | Desirable Range | Preferred Range |
|---|---|---|---|
| Ethylene Vinyl Acetate | 35-60 | 35-55 | 40-50 |
| Optional second carrier resin | 0-50 | 10-40 | 20-30 |
| Optional Filler(s) | 0-50 | 25-45 | 30-40 |

Making the Masterbatch Step 1—Melting of Carrier Resin

The preparation of masterbatches of the present invention is uncomplicated. The masterbatch of the present invention can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Making the Masterbatch Step 2—Addition of the Heat-Sensitive Functional Additive to Masterbatch A mechanical process, either batch or continuous, can be used to physically mix the masterbatch of Step 1 in the form of pellets with the heat-sensitive functional additive. With the masterbatch in a mixing vessel capable of internal or external agitation, the heat-sensitive functional additive can be added to that vessel, followed by closing the vessel and periodically agitating the vessel and its ingredients for intervals of time ranging from about 0.5 to about 12 and preferably from about 1 to about 4 hours. Dwell time in the vessel can range from about 6 to about 48 and preferably from about 12 to about 24 hours during which this periodic mixing can occur.

While no heating is needed, it is possible to include some heating well below the vapor point of the heat-sensitive functional additive.

In the circumstance where the heat-sensitive functional additive is a liquid, such as a fragrance, the liquid is absorbed into the masterbatch. In the circumstance where the heat-sensitive functional additive is a solid, such as an ultraviolet light absorber, the solid is intimately intermixed into the masterbatch powder or pellets.

The weight percentage of heat-sensitive functional additive present in the masterbatch can range from about 10 to about 40 and preferably from about 10 to about 30 weight percent of the masterbatch.

ethylene terephthalate (PET), polybutylene terephthalate (PBT), polyoxymethylene (POM), polyamide (PA), polystyrene (PS), polymethylmethacrylate (PMMA), polyphenylene sulfide (PPS) or polylactic acid (PLA), any copolymer of any of them, any combination thereof.

The compound can also contain one or more conventional plastics additives in an amount that is sufficient to obtain a desired processing or performance property for the thermoplastic compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silanes coupling agents, titanates and zirconates coupling agents; slip and anti-blocking agents; stabilizers; stearates; ultraviolet light absorbers; viscosity regulators; PE waxes; catalyst deactivators, and combinations of them.

The final thermoplastic compound can comprise, consist essentially of, or consist of any one or more of the thermoplastic resins, heat-sensitive functional additive(s), in combination with any one or more optional functional additives. Any number between the ends of the ranges is also contemplated as an end of a range, such that all possible combinations are contemplated within the possibilities of Table 2 as candidate compounds for use in this invention. Let down ratios of masterbatch into thermoplastic resins can range from about 2:1 to about 400:1 (about 50% LDR to about 0.25% LDR) depending on desired final loading and usage rate to achieve that final loading of heat-sensitive functional additive.

TABLE 2

Resin, Fillers, Heat-Sensitive Functional Additive, and Optional Additional Functional Additives

| Ingredient | Acceptable | Desirable | Preferable |
| --- | --- | --- | --- |
| Thermoplastic Resin(s); Fillers; and Masterbatch of Table 1 including Thermoplastic Resin(s) and Optional Filler | 85-99.999% | 90-99.998% | 95-99.99% |
| Heat-Sensitive Functional Additive(s) | 0.001-15% | 0.002-10% | 0.01-5% |
| Optional Functional Additive(s) | 0-5 | 0-3 | 0-1 |

Compounds and Uses of Compounds

Any of the masterbatches loaded with heat-sensitive functional additive(s) described above can be melt-mixed with a thermoplastic resin.

Candidate thermoplastic resins can be polypropylene (PP), polyethylene (PE), polyvinyl chloride (PVC), polycarbonate (PC), acrylonitrile-butadiene-styrene (ABS), poly- Processing The preparation of finally shaped plastic articles is uncomplicated and can be made in batch or continuous operations.

Extrusion, as a continuous operation, or molding techniques, as a batch operation, are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

The combination of thermoplastic resin, masterbatch containing heat-sensitive functional additive(s), and optional other functional additives can be made into any extruded, molded, spun, casted, calendered, thermoformed, or 3D-printed article. Key to this combination is that the heat-sensitive functional additive up to the moment of any of these final-shaping events has not experienced a first heat history during preparation of the masterbatch. Also, because the heat-sensitive functional additive is sheltered by absorption or intimate mixing with the masterbatch, its presence in the melt-mixing of final-shaping is retained as much as feasible within the batch or continuous melt-mixing equipment, thereby retaining as much as feasible for performance of its functional duties in the finally-shaped plastic article.

Candidate end uses for such finally-shaped thermoplastic articles are listed in summary fashion below.

Appliances: Refrigerators, freezers, washers, dryers, toasters, blenders, vacuum cleaners, coffee makers, and mixers;

Building and Construction: Fences, decks and rails, floors, floor covering, pipes and fittings, siding, trim, windows, doors, molding, and wall coverings;

Consumer Goods: Power hand tools, rakes, shovels, lawn mowers, shoes, boots, golf clubs, fishing poles, and watercraft;

Electrical/Electronic Devices: Printers, computers, business equipment, LCD projectors, mobile phones, connectors, chip trays, circuit breakers, and plugs;

Healthcare: Wheelchairs, beds, testing equipment, analyzers, labware, ostomy, IV sets, wound care, drug delivery, inhalers, and packaging;

Industrial Products: Containers, bottles, drums, material handling, gears, bearings, gaskets and seals, valves, wind turbines, and safety equipment;

Consumer Packaging: Food and beverage, cosmetic, detergents and cleaners, personal care, pharmaceutical and wellness containers;

Transportation: Automotive aftermarket parts, bumpers, window seals, instrument panels, consoles, under hood electrical, and engine covers; and Wire and Cable: Cars and trucks, airplanes, aerospace, construction, military, telecommunication, utility power, alternative energy, and electronics.

Examples explain the preparation of the masterbatch and the test of absorption of heat-sensitive functional additive.

EXAMPLES

Examples 1-8 and Comparative Examples A-E were masterbatches made by melt-mixing the carrier resin(s) and optional filler(s) at a temperature of 170-200° C. using a twin screw extruder which formed pellets. Then, an amount of fragrance was mixing into each masterbatch, with success being 10% or more weight percent of absorption into the masterbatch. Table 3 shows the ingredients and results.

TABLE 3

| Ingredient (Wt. %) | Example 1 | Example 2 | Example 3 | Example 4 | Example 5 | Example 6 | Example 7 |
|---|---|---|---|---|---|---|---|
| PP-Y-3700 Polypropylene Carrier Resin (Jinshan) | 20 | | 30 | | | | |
| Elvax Ethylene-Vinyl Acetate Copolymer Carrier Resin (DuPont) | 39.98 | 50 | 50 | 60 | 40 | 50 | 50 |
| LOTRENE LA0710 low density polyethylene (LDPE) Carrier Resin (ATO Fina) | | | | | 20 | 50 | |
| ABS CYCOLAC X17 Carrier Resin (SABIC) | | | | | | | 20 |
| NCC-610 Calcium Carbonate Filler (Formosa Carbide) | 40 | 50 | 20 | 40 | 40 | | 30 |
| Ti-Pure Filler (DuPont) R-103 | | | | | | | |
| Bayferrox Red 130 M synthetic red iron oxide colorant (Lanxess) | 0.02 | | | | | | |
| Wt. % Total | 100 | 100 | 100 | 100 | 100 | 100 | 100 |
| Test Results | Success | Success | Success | Success | Success | Success | Success |

| Ingredient (Wt. %) | Example 8 | Comp. Example A | Comp. Example B | Comp. Example C | Comp. Example D | Comp. Example E |
|---|---|---|---|---|---|---|
| PP-Y-3700 Polypropylene Carrier Resin (Jinshan) | 30 | | | 40 | | |
| Elvax Ethylene-Vinyl Acetate Copolymer Carrier Resin (DuPont) | 50 | 33.3 | 20 | 20 | 25 | 30 |
| LOTRENE LA0710 low density polyethylene (LDPE) Carrier Resin (ATO Fina) | | 66.7 | 40 | | 75 | |
| ABS CYCOLAC X17 Carrier Resin (SABIC) | | | | | | |

TABLE 3-continued

| | | | | | | |
|---|---|---|---|---|---|---|
| NCC-610 Calcium Carbonate Filler (Formosa Carbide) | | | 40 | 40 | | 70 |
| Ti-Pure Filler (DuPont) R-103 | 20 | | | | | |
| Bayferrox Red 130 M synthetic red iron oxide colorant (Lanxess) | | | | | | |
| Wt. % Total | 100 | 100 | 100 | 100 | 100 | 100 |
| Test Results | Success | Failure | Failure | Failure | Failure | Failure |

Test: SES013402 Fragrance from Givaudan was mixed at ambient temperature for 24 hours. If 10 weight % or more of the fragrance was absorbed, then the experiment was a success.

Examples 1-8 demonstrated that EVA is a required carrier resin for this particular fragrance to be absorbed into the masterbatch after the first heat history for that masterbatch and before let down via melt-mixing into thermoplastic resin at the second heat history of the masterbatch.

Comparative Examples A-E distinguish from Examples 1-8, in that the amount of weight percent of EVA must be at least about 35 weight percent, desirably about 37.5 weight percent, and preferably at least about 40 weight percent in order for the absorption of the fragrance to succeed in 10 or more weight percent.

The invention is not limited to the above embodiments. The claims follow.

What is claimed is:

1. A masterbatch, comprising:
   (a) heat-sensitive functional additive and
   (b) ethylene vinyl acetate copolymer and
   (c) an inorganic filler, or a second carrier resin, or both,
   wherein the ethylene vinyl acetate copolymer comprises from about 35 weight percent of the masterbatch to about 60 weight percent of the masterbatch;
   wherein the second carrier resin is selected from the group consisting of polypropylene (PP), polyethylene (PE), polyvinyl chloride (PVC), polycarbonate (PC), acrylonitrile-butadiene-styrene (ABS), polyethylene terephthalate (PET), polybutylene terephthalate (PBT), polyoxymethylene (POM), polyamide (PA), polystyrene (PS), polymethylmethacrylate (PMMA), polyphenylene sulfide (PPS), or polylactic acid (PLA), any copolymer of any of them, any combination thereof;
   wherein the heat-sensitive functional additive which has a boiling point of less than about 150° C. and is selected from the group consisting of fragrances, colorants, ultraviolet or visible light absorbers, lubricants, anti-static agents, antimicrobial agents, and combinations thereof;
   wherein the inorganic filler is selected from the group consisting of talc, mica, barium sulfate, titanium dioxide, calcium carbonate, silicon dioxide, and combinations thereof; and
   wherein the heat-sensitive functional additive has been absorbed at ambient temperature into a mixture of the ethylene vinyl acetate copolymer and the inorganic filler or the second carrier resin or both.

2. A polymer compound, comprising:
   (a) masterbatch of claim 1;
   (b) thermoplastic resin; and
   (c) optionally a functional additive selected from the group consisting of anti-oxidants, anti-stats, acetaldehyde scavengers, blowing agents, surfactants, biocides, exfoliated nanoclays, ultraviolet stabilizers, and combinations of them.

3. The compound of claim 2, wherein the thermoplastic resin is selected from the group consisting of polypropylene (PP), polyethylene (PE), polyvinyl chloride (PVC), polycarbonate (PC), acrylonitrile-butadiene-styrene (ABS), polyethylene terephthalate (PET), polybutylene terephthalate (PBT), polyoxymethylene (POM), polyamide (PA), polystyrene (PS), polymethylmethacrylate (PMMA), polyphenylene sulfide(PPS), polylactic acid (PLA), any copolymer of any of them, and any combination thereof.

4. The compound of claim 2, wherein the compound further comprises adhesion promoters; biocides; anti-fogging agents; anti-static agents; bonding, blowing and foaming agents; dispersants; fillers, fibers, and extenders; flame retardants; smoke suppressants; impact modifiers; initiators; lubricants; micas; pigments, colorants and dyes; plasticizers; processing aids; release agents; silane coupling agents, titanates and zirconates coupling agents; slip and anti-blocking agents; stabilizers; stearates; ultraviolet light absorbers; viscosity regulators; PE waxes; catalyst deactivators, or combinations of them.

5. The compound of claim 2, wherein the amount of heat-sensitive functional additive ranges from about 0.01 to about 5 weight percent of the compound.

* * * * *